United States Patent
Iltshenko et al.

(10) Patent No.: US 9,903,026 B2
(45) Date of Patent: Feb. 27, 2018

(54) METHOD FOR THE PRODUCTION OF DISINFECTANTS WITH A CONCENTRATION OF ACTIVE CHLORINE IN THE RANGE FROM 2000 AND UP TO 6000 PPM FROM A FLOW THROUGH DIAPHRAGM ELECTROLYZER

(71) Applicants: Valeri Iltshenko, Tallinn (EE); Nikolay Nayda, Tallinn (EE)

(72) Inventors: Valeri Iltshenko, Tallinn (EE); Nikolay Nayda, Tallinn (EE)

( * ) Notice: Subject to any disclaimer, the term of this patent is extended or adjusted under 35 U.S.C. 154(b) by 498 days.

(21) Appl. No.: 14/258,479

(22) Filed: Apr. 22, 2014

(65) Prior Publication Data
US 2015/0218715 A1    Aug. 6, 2015

(30) Foreign Application Priority Data
Feb. 4, 2014   (EE) .................................. 201400004

(51) Int. Cl.
*C25B 1/26*    (2006.01)
*C02F 1/467*   (2006.01)

(52) U.S. Cl.
CPC .............. *C25B 1/26* (2013.01); *C02F 1/4674* (2013.01); *C02F 2201/46115* (2013.01); *C02F 2201/46145* (2013.01)

(58) Field of Classification Search
CPC ................................. C02F 1/4674; C25B 1/26
See application file for complete search history.

(56) References Cited

U.S. PATENT DOCUMENTS

| | | | |
|---|---|---|---|
| 3,076,754 A * | 2/1963 | Evans | C25B 9/00 204/237 |
| 7,833,392 B2 | 11/2010 | Nanjundiah et al. | |
| 7,897,023 B2 | 3/2011 | Bakhir et al. | |
| 8,298,383 B2 | 10/2012 | Iltsenko et al. | |
| 2011/0186462 A1* | 8/2011 | Storey | C25B 1/26 206/524.1 |
| 2012/0168319 A1* | 7/2012 | Iltsenko | C02F 1/461 205/556 |

FOREIGN PATENT DOCUMENTS

| | | |
|---|---|---|
| EE | 05608 | 12/2012 |
| GB | 1396765 | 6/1975 |
| JP | 200051860 | 2/2000 |
| RU | 2350692 | 3/2009 |

* cited by examiner

*Primary Examiner* — Ibrahime A Abraham
*Assistant Examiner* — Salil Jain
(74) *Attorney, Agent, or Firm* — Berggren Inc.

(57) ABSTRACT

A method for production of disinfectant with active chlorine concentration in the range 0-6000 ppm from a flow through diaphragm—electrolyzer with one of the aims to reduce the volume of disinfectant for its transportation to the point of usage.

3 Claims, 1 Drawing Sheet

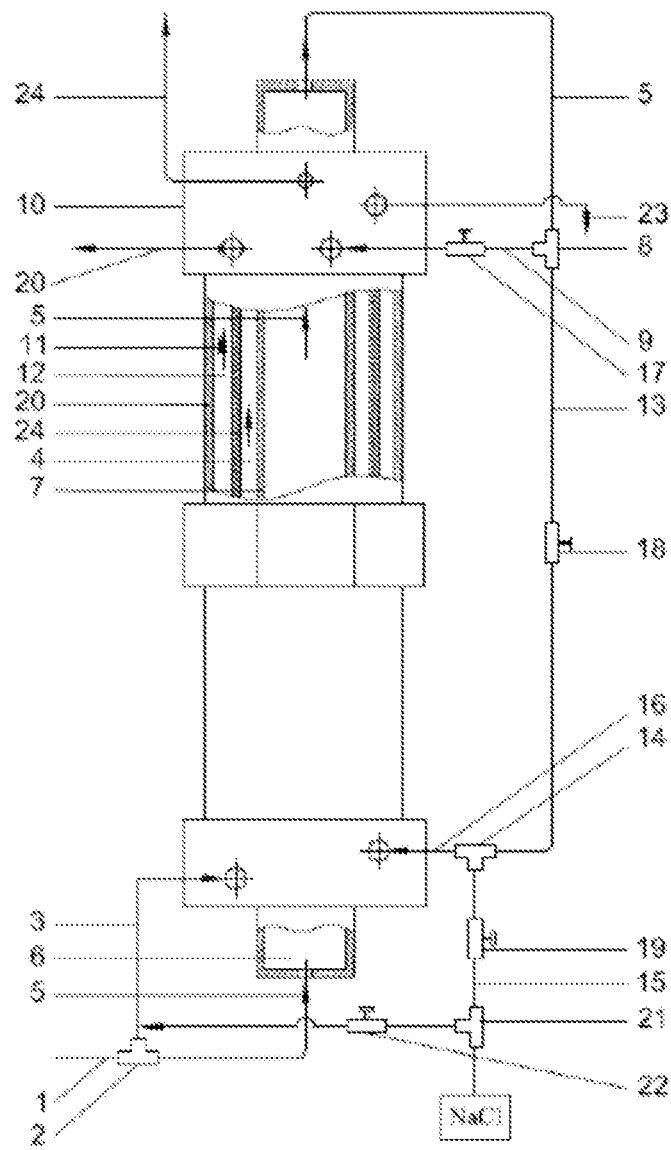

METHOD FOR THE PRODUCTION OF DISINFECTANTS WITH A CONCENTRATION OF ACTIVE CHLORINE IN THE RANGE FROM 2000 AND UP TO 6000 PPM FROM A FLOW THROUGH DIAPHRAGM ELECTROLYZER

PRIORITY

This application claims priority of the Estonian national patent application number 201400004 filed on Feb. 4, 2014 the contents of which are incorporated herein by reference in entirety.

FIELD OF INVENTION

The invention belongs in the field of catering to the vital needs of people, specifically in the field of hygiene by means of disinfectants produced from aqueous solutions, especially from the aqueous solution of sodium chloride through electrolysis in a flow through diaphragm electrolyser. The invention provides a method for the production of disinfectants with active chlorine concentration in the range of 0-6000 ppm from a flow through diaphragm electrolyser, and at reducing the volume of the disinfectant for its transportation to the point of usage.

BACKGROUND

Electrolysis of the aqueous solution of sodium chloride in an anode compartment results in an anolyte that contains active chlorine compounds. An anolyte obtained with a prescribed concentration of active chlorine is a disinfectant that is widely used in various fields for disinfection and sterilisation.

The disinfectants that are normally used have the active chlorine concentration of not more than 500-800 ppm, and in case of production with diaphragm electrolysis, approximately 1500 g active chlorine is obtained per hour per one device. With the increase in the output of electrolysis devices by up to 8000 grams per hour, the opportunities for the application of the anolyte become wider in industrial technologies that require disinfectants with the active chlorine concentration of 2000-6000 ppm. Furthermore, the existence of high output electrolysis devices gave the possibility of centralised disinfectant production and delivery to consumers. In order to reduce transportation costs, the disinfectants with a high concentration of active chlorine became highly in demand.

A known method for the production of disinfectants with a high active chlorine concentration, whereby the chlorine is obtained from the electrolyser as gas which is then dissolved in water, such as chlorine dioxide, is provided in U.S. Pat. No. 7,833,392 [1]. The disadvantage of this method is that it requires higher safety precautions on account of leaking gas, and inadequate dissolution of the gas in water—less than 2.9 g/l.

U.S. Pat. No. 7,897,023 [2] describes a method for obtaining a mixture of oxidants from an electrolyser, mainly gaseous chlorine with the following dissolution in water. Besides the certain efficiency of this method, the disadvantage of this method is that it requires higher safety precautions due to leaking gaseous chlorine and the complexity of hydraulic connections for the production of large quantities of disinfectant, since the electrolyser on which the method [2] is based has low productivity—only about 40 grams of active chlorine per hour. This method [2] is also complicated due to the need to use a circulation circuit and special external heat exchangers for the cooling of electrolytes.

There are methods for the production of disinfectant in a liquid state by means of an electrolyser. Such disinfectants include the known sodium hypochlorite which is obtained through electrolysis. The methods for its production are not viewed, because sodium hypochlorite is obtained in another type of electrolyser—an electrolyser without a diaphragm, therefore the method for the production of sodium hypochlorite is not comparable with the method presented herein.

A method for the production of disinfectant with an electrolyser by means of sodium chloride electrolysis with the output capacity of more than 600 grams of active chlorine per hour is possible on the basis of the description of electrolyser provided in U.S. Pat. No. 8,298,383 [3]. The disadvantage of patent [3] is that the reduction of flows passing through the electrode compartment for the purpose of producing disinfectants with active chlorine concentration of up to 2000 ppm causes the electrodes to heat up to 100° C.

Patent GB1396765 [4] describes a method for the production of disinfectant, wherein the heat of an anode as the inner electrode is lowered by passing coolant through a hollow inside the anode. The disadvantage of this method is its complexity due to the auxiliary external circulation circuit and a heat exchanger required for the cooling of the liquid.

Patent RU2350692 [5] describes a method, wherein the flow of electrolyte from the outside is channelled into a hollow in the anode, cooling it, and then flowing into the cathode compartment for producing the catholyte. The disadvantage of this method is that the method is not intended for the production of disinfectants and that the electrolyte enters the hollow in the anode from internal space through perforation in the anode wall, reducing the durability of the anode coating and the functioning order of the anode.

For the reduction of catholyte heating, the method of cooling by means of a Peltier element is also used in a known method (Thermoelectric Cooler—TEC), see e.g. patent JP2000051860 [6]. The disadvantage of this method is its low output caused by the low capacity of the Peltier element—up to 100 W·h, which allows taking out heat of no more than 4 liters per hour when producing disinfectants with active chlorine concentration of up to 6000 ppm.

In terms of embodiment and the achieved result, patent EE05608 [7] is the closest method, where the whole flow of water that passes into the electrolyser is initially divided into two parts: one part is guided into the cathode compartment, the second part is divided into two flows, one of which is guided into the anode compartment and the second flow is guided into an inner hollow in the cathode and then to the upper cover of the electrolyser for the purpose of diluting the anolyte to the required active chlorine concentration in the disinfectant, i.e. only part of the total water intended for the dilution of anolyte in the upper cover is guided to the cooling of the cathode. The active chlorine concentration in the anolyte before the anolyte reaches the upper cover of the electrolyser is up to 3000 ppm. This method [7] is regarded as the closest analogue. However, the disadvantage of this method, which was initially planned for the production of disinfectant at 500 ppm, is its limited capacity to yield disinfectants with high concentration, because the flow that is intended for the anode compartment enters the anode compartment, bypassing the inner hollow of the cathode, not participating in the cooling of the cathode and also not participating in the cooling of the catholyte, whereby the catholyte is only cooled by the flow that is intended for the reduction of active chlorine concentration in the disinfectant of less than 3000 ppm. However, with the need for production of disinfectants with active chlorine concentration of 3000 ppm, diluting the anolyte will no longer be necessary, i.e. the dilution flow that passes through the inner hollow of the cathode is stopped and only 2 flows will pass through the electrolyser: one flow through the cathode compartment, the other flow through the anode compartment, and method [7] becomes method [3] with a disadvantage that is related to the heating of electrolytes in the electrode compartments. As a result, application of method [7] in practice yields disinfectants with active chlorine concentration of no more than 2000 ppm, or cooling circulation circuits were to be used in order to obtain higher concentrations.

SUMMARY OF THE INVENTION

The objective of the invention is to extend the range of active chlorine concentration in the disinfectant and to produce disinfectants with adjustable active chlorine concentration from 0 to 6000 ppm with a simple method by means of a diaphragm electrolyser, without using external cooling circulation circuits and Peltier elements.

The objective is solved on account of the method for the production of disinfectants with a diaphragm electrolyser, which includes the formation of flow through a cathode compartment, as it foresees branching only a very small portion of fresh water through an inner hollow of the cathode, whereas the following differences have been planned:
  the whole volume of water for the formation of flow in the anode compartment passes initially through the inner hollow of the cathode;
  the flow rate through the anode compartment shall not be less than 3.3 liters per hour per anode compartment at electric power 100 W·h, which in the viewed examples accounts for 4 liters per hour per 1 dm² of anode surface facing the cathode.

In the presented method, the causal relations between the achieved results and flow directions and volumes have been reached. In the viewed examples the entire flow that is intended for the formation of flow is passed through the anode compartment, the inner hollow of the cathode, whereas the volume of flow through the inner hollow of the cathode is not less than 4 liters per hour calculated per 1 dm² of the anode surface facing the cathode, while the volume of flow guided to the anode compartment also accounts for not less than 4 liters per hour per 1 dm² of the anode surface facing the cathode. These characteristics of the method are related to the operating conditions of the electrolyser: low volume of flow through the cathode compartment, difficulties in the heat exchange due to the diaphragm between the anode and cathode compartments (the presented method was tested, using a ceramic diaphragm), the method employs operating current not exceeding 24 A per 1 dm² and is not destructive for the protective coating of the anode surface facing the cathode. The voltage between the electrodes does not exceed 10 V. As an example of the calculation, an electrolyser is viewed where the area of anode surface is 1 dm². Anolyte from the sodium chloride solution flows through the anode compartment into fresh water at 4 liters per hour, almost 15 g/l. Catholyte flows from the fresh water through the cathode compartment at 0.16 liters per hour. This catholyte is the alkali sodium hydroxide in which fresh water was generated during the electrolysis, flowing through the inner hollow of the cathode at 4 liters per hour.

Since the electric conductivity of the flows through the anode compartment and through the cathode compartment is approximately the same, the distance from the anode to the diaphragm and the distance from the cathode to the diaphragm is approximately the same, and the voltage drop in both compartments can be 5 V at maximum, the current used in the calculation is 24 A. If there was no flow passing through the inner hollow of the cathode, the temperature of the catholyte at the flow rate of 0.16 liters per hour could increase within 1 hour to:

$$\frac{5V \times 24A \times 3600 \text{ sec}}{4187 \text{ g/l} \times 0.161} = 644.8 \text{ °C.}$$

In other words, the catholyte would start boiling, 7 minutes in this example. However, in 7 minutes the catholyte actually heats up to 45° C., therefore, in connection with the high electric conductivity of the metal wall of the cathode, the heat from 120 W·h transfers not only to the catholyte at the rate of 0.16 liters per hour, but also to the flow 4 liters per hour through the inner hollow of the cathode. In a case of ideal thermal conductivity of the cathode wall, the temperature of the cathode should increase to 24.8° C. In the actual process of disinfectant production the catholyte initially heats up by 45° C. in comparison with the initial temperature of fresh water; the fresh water in the inner hollow of the cathode heats up by 16° C. The water from the inner hollow of the cathode is guided to mixing with sodium chloride, and the sodium chloride solution is guided to the anode compartment, where the solution is heated up by further 25.8° C., i.e. the calculated temperature of the solution in the anode compartment exceeds the initial temperature of water by 40.8° C. Actually, the temperature of the solution discharged from the anode compartment exceeds the initial temperature of water by less than 35° C., because in the actual process of method embodiment the heat is transmitted into the ambient environment through the metal wall of the anode. The flow of fresh water through the inner hollow of the cathode is necessary primarily during the first operating hour of the electrolyser until the diaphragm has gained supplementary heat conductivity.

The diaphragm, which has become completely wet, allows the anolyte to be involved in the cooling of the catholyte. At the current of 24 A per 1 dm² of the anode surface facing the cathode, every 4 liters per hour of sodium chloride solution yields anolyte at 4 liters per hour, which contains no less than 24 grams of active chlorine, i.e. producing a disinfectant with the active chlorine concentration of not less than 6000 ppm. In order to prevent further heating of electrolytes, the current passing through the anode compartment is 100 W·h, not less than 3.3 liters per hour per anode compartment, and the current passing through the cathode compartment is 100 W·h, not less than 0.13 liters per hour per cathode compartment.

Thereby, the presented method has the following important features:
1) the whole flow of water intended for the formation of flow through the anode compartment and the whole flow that is necessary for the dilution of anolyte to a concentration below 6000 ppm is guided to the inner hollow of the cathode;
2) the rate of anolyte flow through the anode compartment by not less than 3.3 liters per hour at converted electric energy of 100 W·h applied in the anode compartment, and the rate of catholyte flow through the cathode compartment by not less than 0.13 liters per hour at converted electric energy of 100 W·h applied in the cathode compartment, are required and sufficient for the achievement of technical results for extending the range of active chlorine concentration in disinfectants to up to 6000 ppm and for producing disinfectants with active chlorine concentration of 6000 ppm in an acceptable heat schedule without using any cooling circulation circuits and Peltier elements.

The invention in the presented method allows extending the range of active chlorine concentration in disinfectants of 0-2000 ppm from the concentration of the closest analogue to the concentration of 0-6000 ppm, and reduces the volume of the disinfectant for its transportation to the point of usage.

SHORT DESCRIPTION OF THE DRAWINGS

FIG. 1 provides a chart of the method for the production of disinfectants with a diaphragm electrolyser.

DETAILED DESCRIPTION OF THE INVENTION

Referring to FIG. 1:

The initial fresh water flow 1 is divided into two flows by means of a T-piece 2 through which fresh water flow 3 is guided into cathode compartment 4, while fresh water flow 5 is guided into an inner hollow 6 inside cathode 7. From the inner hollow 6 the flow 5 is guided into T-piece 8 that divides the flow 5 into two flows of which fresh water flow 9 is guided to the upper cover 10 of the electrolyser for the purpose of mixing with anolyte 11 that arises through the anolyte compartment 12 to the upper cover 10, while fresh water flow 13 is guided into mixer 14, where flow 13 is mixed with the flow of concentrated sodium chloride solution 15. After the mixer 14 the electrolyte flow 16 in the form of sodium chloride solution is guided into anode compartment 12.

The rate of flow 9 is adjusted by means of regulator 17, the rate of flow 13 is adjusted by means of regulator 18, and the rate of the flow of concentrated sodium chloride solution 15 is adjusted by means of regulator 19. Regulators 17, 18, 19 can be typical attachments: valves, dampers, dispenser pumps, etc. When the volume of electrolyte 16 that passes through anode compartment 12 is not less than 3.3 liters per hour at electric power 100 W·h per anode compartment, then at sufficient electric power the electrolyte 16 becomes anolyte 11 with the active chlorine concentration of 6000 ppm, which at such concentration is a ready disinfectant 20 and at this point the flow 9 is not used, or in case of producing a disinfectant with the active chlorine concentration of less than 6000 ppm, the anolyte is mixed in the upper cover 10 with the fresh water coming from flow 9. The pH of the disinfectant is adjusted similarly to flow 3 in the method of the method of [7], where it is guided to cathode compartment 12 due to changes in mineralisation. The FIGURE presents a version where the solution of concentrated sodium chloride is added to fresh water flow 3 by means of T-piece 21 and regulator 22 of the volume of sodium chloride solution.

The products of the electrolysis in the form of catholyte 23 and hydrogen 24 in cathode compartment 12 are discharged for disposal.

Thereby FIG. 1 illustrates how in the embodiment of the presented method the catholyte flow 4 is protected against overheating by means of fresh water flow 5, which always flows through the inner hollow of cathode 7, cooling down catholyte 4, and the amount of which is at least equal with the amount of anolyte 11.

The results of tests conducted with the presented method confirm the functioning of the method and are presented in the table below.

TABLE

Temperature of disinfectant and catholyte in the presented method at initial water temperature 12° C.

| Concentration of active chlorine in the disinfectant | Temperature ° C. after 120 minutes of electrolysis | |
|---|---|---|
| | disinfectant | catholyte |
| 500 ppm | 16 | 14 |
| 2000 ppm | 22 | 20 |
| 3000 ppm | 25 | 23 |
| 6000 ppm | 42 | 40 |

What is claimed is:

1. A method for production of a disinfectant with active chlorine concentration higher than 2000 ppm and up to 6000 ppm from a flow through a cylindrical diaphragm electrolyzer having an anode compartment, a cathode compartment, and a diaphragm between the anode and the cathode compartments, and the cathode compartment comprising a cylindrical cathode having an inner hollow, wherein the method comprises:
   a) dividing initial fresh water flow into a flow into a space outside the cylindrical cathode in the cathode compartment and a flow inside the inner hollow in the cathode compartment and cooling catholyte by means of the water flow through the inner hollow,
   b) after the cooling step a) dividing the flow through the inner hollow into a flow in the anode compartment and into a flow for an anolyte dilution in an upper cover of the electrolyzer,
   c) regulating the flow rate through the anode compartment to be at least 3.3 liters per hour per 100 W·h electric energy passing through every 1 dm$^2$ in the anode,
   d) regulating the catholyte flow rate in the space outside the cylindrical cathode to be at least 0.13 liters per hour per 100 W·h electric energy applied in every 1 dm$^2$ in the cathode, and
   e) discharging the produced catholyte and anolyte from the electrolyzer, wherein the anolyte is disinfectant with an active chlorine concentration higher than 2000 ppm and up to 6000 ppm, while temperature of the catholyte and anolyte during steps a) to e) remains under 50° C., solely due to the cooling step a).

2. A method for production of a disinfectant with active chlorine concentration higher than 2000 ppm and up to 6000 ppm from a flow through a diaphragm electrolyzer by cooling a cathode without external cooling and using only total fresh water flow through the electrolyzer for cooling, wherein the electrolyzer comprises an anode compartment, a cathode compartment and a diaphragm in between the compartments, and the cathode compartment comprises a cylindrical cathode having an inner hollow, said method comprising the steps of:
   a) dividing an initial fresh water flow to a first flow guided into a space outside the cylindrical cathode in cathode compartment and a second flow guided into an inner hollow inside the cathode;

b) guiding the second flow from the inner hollow inside the cathode into a divider dividing the second flow to a third and a fourth flow;
c) guiding the third flow to an upper cover of the electrolyzer and mixing it with an anolyte rising through the anolyte compartment to the upper cover;
d) guiding the fourth flow into a mixer and mixing it with a concentrated sodium chloride solution;
e) guiding a sodium chloride mixture resulting from step d) into the anode compartment;
f) adjusting the rates of the third and fourth flows with regulators so that the volume of electrolytes passing through the anode compartment is at least 3.3 liters per hour at electric energy of 100 W·h passing through every 1 $dm^2$ in the anode, and the flow rate through the space outside the inner hollow in the cathode compartment is at least 0.13 liters per hour per 100 W·h electric energy applied in every 1 $dm^2$ of the cathode; and
g) receiving a disinfectant with active chlorine concentration of higher than 2000 ppm and up to 6000 pm.

3. The method of claim 2, wherein temperature of the disinfectant and the catholyte is maintained below 50° C. solely by the water flow through the inner hollow.

\* \* \* \* \*